3,012,933
HALOGENATED SPIRO INSECTICIDAL COMPOUNDS AS INSECTICIDES

Donald D. Phillips, Modesto, Calif., assignor to Shell Oil Company, New York, N.Y., a corporation of Delaware
No Drawing. Filed May 23, 1960, Ser. No. 30,736
11 Claims. (Cl. 167—30)

This invention relates to new compositions of matter possessing high toxicity to insects and low toxicity to mammals.

More specifically, this invention relates to a group of polyhalopolycyclic spiro hydrocarbon compounds and to insecticidal compositions containing these compounds.

In order to be practical and commercially useful an insecticide must meet various requirements. It must of course exhibit a high degree of toxicity toward insects and not be prohibitively expensive. It must lend itself to the various methods of dissemination in insect habitats and then must possess some reasonable amount of residual insecticidal activity. It must remain chemically stable during storage and use. Other requirements for specific purposes may also be added to the foregoing.

Regardless of an insecticide's ability to meet some or all of these requirements, a commercial insecticide for many purposes must be relatively non-toxic to mammals or its employment will be severely limited if not entirely unsuitable. It is obvious that a composition which kills domestic animals and perhaps humans as efficiently as it does insects has little practical value as an insecticide under some circumstances.

Many of the halogenated hydrocarbons that have been discovered have had the serious disadvantage of exhibiting excessive mammalian toxicity and have required special handling and careful or limited use. The compounds of the present invention have substantially overcome this drawback and may therefore be used relatively freely despite the possibility of subsequent contact with mammals.

These new compounds also possess the other prerequisites of a commercial insecticide. For example, they are highly stable and retain their toxicity toward insects for long periods of time without loss of their halogen atoms. They also show exceptionally high residual insecticidal activity.

It is therefore a principal object of this invention to provide a group of insecticides that are simultaneously highly toxic to insects while being relatively non-toxic to mammals.

Another object of this invention is to provide a group of insecticidally active organic compounds which are chemically stable under ordinary conditions of use, particularly in regard to their halogen substituents.

Another object is the production of a group of stable, insecticidally active compounds with high degrees of residual insecticidal activity.

A still further object of this invention is to provide means for the production of these new and valuable insect toxicants.

Other objects, features, capabilities and advantages provided by this invention will later appear.

According to this invention, the new compounds are polyhalopolycyclic spiro hydrocarbons represented by the planar structural formula

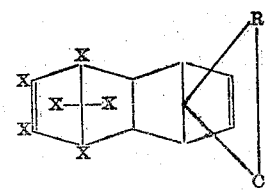

wherein X is a halogen atom and R is an alkylene radical. It is preferred that X is a middle halogen atom, i.e., a bromine or chlorine atom, and is most preferably a chlorine atom. It is also preferred that the alkylene radical R which forms part of a cycloalkyl ring have from 1 to 10 carbon atoms. It is to be particularly noted that this cycloalkyl ring is attached to the remainder of the molecule through a spiro linkage with a methano bridge.

It will be obvious to those skilled in the art that the foregoing planar structure is inclusive of several stereoisomer. The various possibilities for a polycyclic molecule of the type here involved is taught in great detail in U.S. 2,717,851, patented September 13, 1955. The compounds of particular interest of the present invention include those having an endo-endo configuration as described in that patent.

However, the stereochemical configuration of the compounds of the invention has not been determined with absolute certainty. It is believed that the configuration of the products formed by addition of a 1,2,3,4,7,7-hexahalo-bicyclo-(2.2.1)-2,5-heptadiene and a spiro(2,4-cyclopentadiene-1,1'-cycloalkane) is that of a 5,6,7,8,9,9-hexahalo-1,4,4a,5,8,8a-hexahydro - 1,4(1',1') - cycloalkanoendo,endo-5,8-methanonaphthalene. The expression endo, endo thus will be used to denote the probable stereochemical configuration and, in any event, to denote the configuration that results when a 1,2,3,4,7,7-hexahalo-(2.2.1)-2,5-heptadiene is added to a spiro(2,4-cyclopentadiene-1,1'-cycloalkane) in the diene synthesis. Products of this invention produced by the addition of a spiro-(cycloalkane-bicycloheptadiene) such as spiro(cyclopropane-1,1'-bicyclo(2.2.1)-2',5'-heptadiene) and a hexahalo-cyclopentadiene are believed to have the endo,exo configuration; this expression, therefore, when used in the name of products producible in this manner, will be used to denote only the probable configuration but, in any event, that configuration that results when a spiro(cycloalkane-bicycloheptadiene) and a hexahalo-cyclopentadiene are added together by the diene synthesis.

The present compounds may therefore be described as 5,6,7,8,9,9-hexahalo-1,4,4a,5,8,8a-hexahydro - 1,4(1',1')-cycloalkano-5,8-methanonaphthalenes the compounds of particular interest being described as 5,6,7,8,9,9-hexahalo-1,4,4a,5,8,8a-hexahydro-1,4(1',1')-cycloalkano - endo,endo-5,8-methanonaphthalenes, preferably wherein the halogen atoms have atomic numbers lying between 16 and 36, the most preferred halo substituted compounds being 5,6,7,8,9,9-hexachloro-1,4,4a,5,8,8a-hexahydro-1,4-(1',1') - cycloalkano-endo,endo - 5,8 - methanonaphthalenes. Of most interest are those compounds of this latter group wherein the cycloalkano ring has from 3 to 12 carbon atoms.

Specific examples of compounds within the scope of this invention include among others: 5,6,7,8,9,9-hexachloro-1,4,4a,5,8,8a-hexahydro - 1,4(1',1')-cyclopropano-endo,endo - 5,8 - methanonaphthalene; 5,6,7,8,9,9-hexabromo-1,4,4a,5,8,8a-hexahydro - 1,4(1',1') - cyclobutano-endo,endo - 5,8 - methanonaphthalene; 5,6,7,8,9,9-hexabromo-1,4,4a,5,8,8a - hexahydro-1,4(1',1')-cyclopentano-endo,endo - 5,8 - methanonaphthalene; 5,6,7,8,9,9-hexachloro-1,4,4a,5,8,8a - hexahydro - 1,4(1',1')-cyclododecano - endo,endo - 5,8 - methanonaphthalene; 5,6,7 - trichloro - 8,9,9 - tribromo - 1,4,4a,5,8,8a - hexahydro - 1,4 (1',1') - cyclohexano - endo,endo - 5,8 - methanonaphthalene; 5,6,7,8 - tetrachloro - 9,9 - dibromo-1,4,4a,5,8,8a-hexahydro-1,4(1',1')-cyclononano - 3' - ethyl-endo,endo-5,8-methanonaphthalene.

The compounds of particular interest of this invention may be prepared by reacting 1,2,3,4,7,7-hexahalobicyclo-(2.2.1)-2,5-heptadiene with a spiro[2,4-cyclopentadiene-1,1-cycloalkane] by heating the reactants in liquid phase at a temperature and for a time sufficient for appreciable product formation.

Compounds included within the scope of this invention and having one or more other stereochemical configurations may be prepared by reacting a spiro(cycloalkane-cyclopentadiene) with acetylene to give a spiro(cycloalkane-bicycloheptadiene) and reacting the latter compound with a hexahalocyclopentadiene, the reactions occurring by heating the reactants in liquid phase at a temperature and for a time sufficient for appreciable product formation.

It will be apparent to those well versed in the art that any desired compound of this invention may be prepared by the selection of proper reactants. Thus, the method of preparing the preferred chlorine substituted compounds comprises reacting 1,2,3,4,7,7-hexachlorobicyclo-(2.2.1)-2,5-heptadiene with a spiro[2,4-cyclopentadiene-1,1'-cycloalkane] by heating the reactants in liquid phase. Similarly, compounds of this invention having any particular cycloalkano substituent on the methano bridge are prepared by employing as a starting reactant the spiro compound consisting of a 2,4-cyclopentadiene and the particular cycloalkane desired as the substituent on the product.

In general, the conditions employed in the Diels-Alder diene synthesis will most readily produce these novel compounds. In the majority of cases, the reactions proceed rapidly and well at temperatures between 80–150° C. and at atmospheric pressure or at pressures which are only slightly above atmospheric pressure over a three to twenty-four hour time period.

The novel halogenated spiro hydrocarbons embraced by this invention can also be prepared in the presence of suitable solvents. The rate of reaction will be highest if the solvent chosen has a boiling point above 80° C. For this purpose, chlorobenzene, xylene, dibutyl ether, etc. can advantageously be chosen. Solvents such as benzene, toluene, butyl alcohol, and dioxane can also be used but an increase in reaction time will then be necessary.

In general, the synthesis is carried out in approximately equimolar quantities of reactants. It has been found to be advantageous to use a small excess of the halogenated heptadiene reactant.

The details of the method of preparation are best described by reference to the following examples. It is to be understood that these examples are offered for illustrative purposes only and are not to be construed as limiting the present invention.

*Example I*

Over a period of ¾ hour, 22 grams (0.24 mole) of spiro[4.2]-1,3-heptadiene ($n_D^{25}$ 1.5073) was added to 84 grams (0.28 mole) of 1,2,3,4,7,7-hexachlorobicyclo-(2.2.1)-2,5-heptadiene (B.P. 113–114° C. at 1.8 mm.) with stirring while maintaining the temperature at 80–90° C. The temperature was then slowly raised to 140° C. over a 5-hour period. The reaction mixture changed from yellow to red to brown in color.

The reaction mixture solidified when cooled to room temperature. The brown mass was triturated with cold hexane and filtered to afford 53 grams of tan crystals, M.P. 165–169° C. Yield=56%.

Ten grams of this product was recrystallized from hexane (about 12 ml./g.) and identified as 5,6,7,8,9,9-hexachloro-1,4,4a,5,8,8a - hexahydro-1,4(1',1')-cyclopropano-endo,endo-5,8-methanonaphthalene with a melting point of 169–170° C. Identification was based on infrared analysis and the following elemental analysis:

| $Cl_6C_{14}H_{10}$ | C | H | Cl |
|---|---|---|---|
| Calculated | 43.0 | 2.6 | 54.4 |
| Found | 42.8 | 2.6 | 54.4 |

*Example II*

Over a period of one hour, 23.5 grams (0.195 mole) of spiro[4.4]-1,3-nonadiene was added to 72 grams (0.24 mole) of 1,2,3,4,7,7-hexachlorobicyclo-(2.2.1)-2,5-heptadiene with stirring while maintaining the temperature at 80° C. The initially yellow solution turned red and then brown as it was slowly heated to 125° C. over a period of three hours.

Hexane was added to the cooled reaction product but crystals were not produced. Solvent and excess heptadiene was then stripped off at 110° C. (1.2 mm.). Addition of hexane to the residue afforded 16 grams of product as brown crystals, M.P. 120–128° C. These were recrystallized from isopropyl alcohol to afford 4 grams of colorless plates, M.P. 139–141° C. Analysis of the first crop showed it to be 5,6,7,8,9,9-hexachloro-1,4,4a,5,8,8a-hexahydro-1,4(1',1')-cyclopentano-endo,endo - 5,8-methanonaphthalene.

| $Cl_6C_{16}H_{14}$ | C | H | Cl |
|---|---|---|---|
| Calculated | 45.86 | 3.37 | 50.77 |
| Found | 45.6 | 3.7 | 50.7 |

These new products of my invention possess, as has already been noted, great practical usefulness as insect toxicants. They exhibit a high degree of toxicity to a wide variety of insects. The compound prepared in Example I was taken as illustrative of the compounds of this invention and put through a series of tests to demonstrate its high level of toxicity to various insects. The results are tabulated in Examples III and IV.

*Example III*

Grasshoppers and corn earworms were exposed to sprayed broad beans held in a greenhouse.

| Ounces per Acre Sprayed with Compound of Example I | Percent 48-Hour Mortality at Days after Treatment | | | | | |
|---|---|---|---|---|---|---|
| | Grasshoppers | | | Corn Earworms | | |
| | 1 | 3 | 7 | 1 | 3 | 7 |
| 4 | 100 | 100 | 47 | 80 | 13 | 13 |
| 8 | 100 | 100 | 93 | 87 | 47 | 27 |
| 16 | 100 | 100 | 93 | 100 | 87 | 60 |
| Untreated | 7 | 20 | 0 | 0 | 0 | 0 |

*Example IV*

Houseflies were exposed to sprayed pinto bean leaves both in the laboratory and outside.

| Pounds/Acre of Compound of Example I | Stored in— | Percent 24-Hour Mortality at Days after Treatment | | | |
|---|---|---|---|---|---|
| | | 0 | 1 | 4 | 7 |
| 1 | Laboratory | 67 | 62 | 26 | 51 |
| 1 | Outside | 75 | 57 | 50 | 66 |

In tests against *Anopheles albimanus* larvae, the compound of Example I proved itself to be equally effective against this mosquito larvae as it was against the above-mentioned insects.

The above data is also evidence of the fact that the compound of Example I possesses a high residual toxicity.

On the other hand the compounds of this invention, as exemplified by the compound of Example I, have demonstrated an extremely low toxicity to mammals and find commercial uses not otherwise open to them. Illustrative of the minimal adverse effect on mammals is the high dosage required to achieve an LD-50 in mice and rats. The results are found in Example V.

Example V

The compound of Example I was administered to mice and rats and the quantity in mg./kg. required to achieve an LD-50 was recorded. It was determined that the value for mice was 170 and for rats it was 106. The significance of these values will be appreciated when compared to the LD-50 of endrin whose values are 12 and 25 for mice and rats, respectively.

The new compositions of matter of this invention are soluble in all of the common organic solvents and they can be utilized as insect toxicants in all the ways customary in the art. Thus they can be dissolved in the insecticide base oils normally employed and the resulting solutions sprayed or otherwise employed in the usual fashion. They can also be combined with finely divided carriers to produce wettable and non-wettable insecticidal dusts, they can be used in the presence of emulsifying agents, with water, and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of these new compounds make them particularly suitable in a number of less common but highly desirable applications for insecticidal materials. Thus, they can be added to paints, lacquers, varnishes, and polishing waxes which, after application, will give surfaces possessing a high order of insect toxicity. They can be added to paper products of all types either by suitable impregnation of the finished paper materials, or by incorporation during the manufacturing process. Similarly they can be added to tackifiers, plasticizers, printing inks, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packed in them from such attack. Because of their high resistance to the action of alkali, these new compositions can be incorporated into white washes and other similar surface coatings. Those skilled in the art will, of course, recognize that many other similar uses for these unique compounds are possible, all of which follow from the special combination of valuable properties possessed by them.

I claim as my invention:

1. A 5,6,7,8,9,9-hexahalo-1,4,4a,5,8,8a - hexahydro-1,4 (1',1')-cycloalkano-5,8-methanonaphthalene in which the cycloalkano moiety contains up to twelve carbon atoms and the halo moiety has an atomic number between 16 and 36.

2. A 5,6,7,8,9,9-hexahalo-1,4,4a,5,8,8a - hexahydro-1,4 (1',1')-cycloalkano - endo,endo-5,8 - methanonaphthalene in which the cycloalkano moiety contains up to twelve carbon atoms and the halo moiety has an atomic number between 16 and 36.

3. A 5,6,7,8,9,9 - hexachloro-1,4,4a,5,8,8a -hexahydro-1,4(1',1')-cycloalkano-endo,endo-5,8 - methanonaphthalene in which the cycloalkano moiety contains up to twelve carbon atoms.

4. A 5,6,7,8,9,9 - hexachloro-1,4,4a,5,8,8a -hexahydro-1,4(1',1') - cyclopropano - endo,endo - 5,8 - methanonaphthalene.

5. A 5,6,7,8,9,9 - hexachloro-1,4,4a,5,8,8a -hexahydro-1,4(1',1')-cyclopentano-endo,endo - 5,8-methanonaphthalene.

6. As an insecticidal composition of matter a compound of claim 3 disseminated in an insecticidal adjuvant as a carrier therefor.

7. As an insecticidal composition of matter the compound of claim 4 disseminated in an insecticidal adjuvant as a carrier therefor.

8. As an insecticidal composition of matter the compound of claim 5 disseminated in an insecticidal adjuvant as a carrier therefor.

9. The method which comprises applying to insects and their habitats a compound of claim 3.

10. The method which comprises applying to insects and their habitats the compound of claim 4.

11. The method which comprises applying to insects and their habitats the compound of claim 5.

References Cited in the file of this patent

UNITED STATES PATENTS 2,717,851　　Lidov ------------------ Sept. 13, 1955